United States Patent [19]

Fulghum

[11] Patent Number: 5,502,722

[45] Date of Patent: Mar. 26, 1996

[54] METHOD AND APPARATUS FOR A RADIO SYSTEM USING VARIABLE TRANSMISSION RESERVATION

[75] Inventor: Tracy L. Fulghum, Sunrise, Fla.

[73] Assignee: Motorola, Inc., Schaumburg, Ill.

[21] Appl. No.: 283,868

[22] Filed: Aug. 1, 1994

[51] Int. Cl.⁶ ............................................. H04B 7/00
[52] U.S. Cl. ..................... 370/69.1; 370/95.3; 370/85.2; 455/49.1; 375/202; 375/203
[58] Field of Search .................................. 370/69.1, 85.2, 370/91, 95.1, 95.3; 455/33.1, 49.1, 73; 379/58, 59; 375/202, 203

[56] References Cited

U.S. PATENT DOCUMENTS

| | | | |
|---|---|---|---|
| 5,020,056 | 5/1991 | Chennakeshu | 370/95.3 |
| 5,197,125 | 3/1993 | Engel et al. | 370/95.3 X |
| 5,257,398 | 10/1993 | Schaeffer | 455/33.1 |
| 5,384,777 | 1/1995 | Ahmadi et al. | 370/85.2 |
| 5,428,637 | 6/1995 | Oliva, Jr. et al. | 375/202 |
| 5,430,775 | 7/1995 | Fulghum et al. | 375/202 |

*Primary Examiner*—Douglas W. Olms
*Assistant Examiner*—Russell W. Blum
*Attorney, Agent, or Firm*—Andrew S. Fuller

[57] ABSTRACT

A method and apparatus is provided for a operating a radio communication system (100). The system (100) has a sequence of communication channels (205), including a reservation channel, and a channel hopping protocol for operating on the sequence (205). A hop period is defined for the channel hopping protocol. A transceiver (113) monitors the reservation channel to find an open communication slot (213), having a duration less than the channel hop period, and cyclically channel hops through the sequence of communication channels in the open slot (213). The transceiver (113) reserves the communication slot (213) for a subsequent cycle through the sequence by transmitting a reservation signal on the reservation channel.

16 Claims, 6 Drawing Sheets

5,502,722

METHOD AND APPARATUS FOR A RADIO SYSTEM USING VARIABLE TRANSMISSION RESERVATION

TECHNICAL FIELD

This invention relates in general to a radio communication system, and more particular, to a radio communication system having communication devices operating over shared communication channels.

BACKGROUND

Radio communication systems which support communication among several users operating in wireless environment over radio frequencies are known. The frequencies used by these systems are a subset of the radio frequency spectrum which are organized into one or more radio communication channels, such as frequency channels. In such a system, for example, a communication link may be established between groups of communication devices within the radio system. The communication link is established over one or more frequency channels for the duration of the communication. Generally, the frequency spectrum available for a given radio system is a limited communication resource, and several users may be competing for this resource. Thus, a radio communication system typically employs a frequency management methodology in order to maximize the efficient use of the available frequencies, and to minimize interference among users. This approach is essential where multiple communication links must be established over shared communication channels.

Many frequency sharing methodologies are known in the art. Examples include, channel hopping, direct sequence spread spectrum, time division multiplex, and other similar schemes. Most prior art frequency sharing methods employ an infrastructure to manage the operational aspects of a radio communication system. An infrastructure typically includes a base station, or some other type of controller, which manages frequency assignments, user access, collision detection and resolution, and other operational aspects of a radio system. These controllers tend to represent a significant cost in the establishment of a radio communication system.

Low cost radio communication systems are becoming an increasingly important segment of the wireless communication market. These low cost systems must also successfully manage frequency allocation among users in order to maximize efficiency and throughput. Therefore, it is desirable to have a low cost radio communication system which promotes efficient use of shared communication resources.

DETAILED DESCRIPTION OF THE PREFERRED EMBODIMENT

Figure 1:
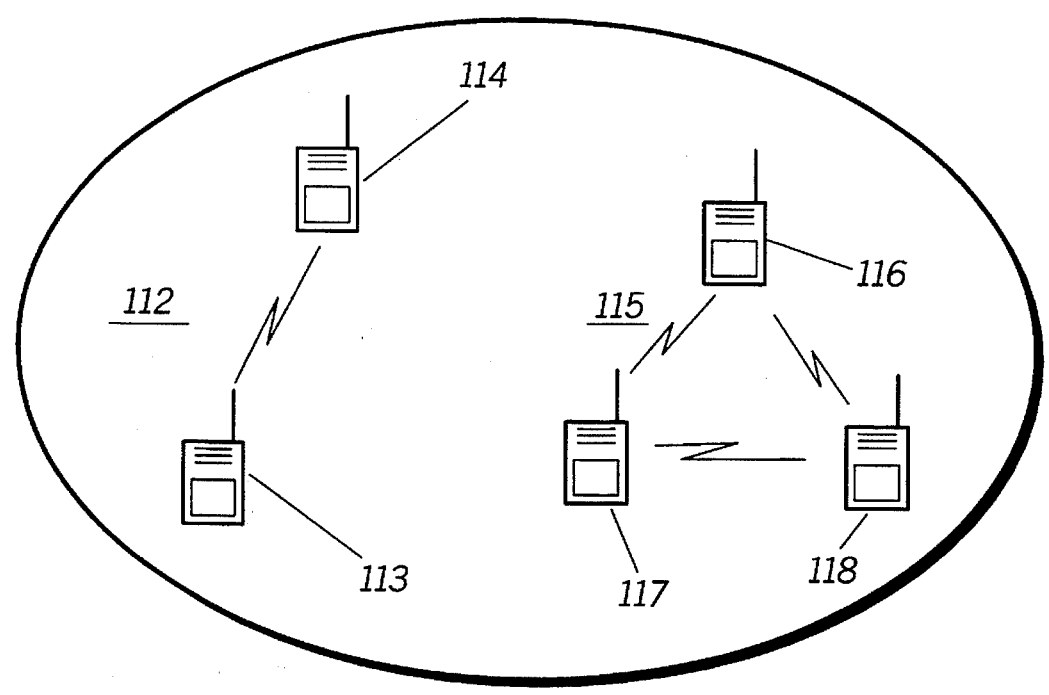
FIG. 1 is a radio communication system having two groups of communicating transceivers, in accordance with the present invention.

Referring to FIG. 1, a radio communication system 100 having different groups of communication devices, such as transceivers, operating under a communication channel hopping protocol is shown, in accordance with the present invention. In the preferred embodiment, the communication devices are two-way portable radio transceivers capable of establishing radio frequency (RF) communication links. Other types of communication devices may be used, such as mobile radios, base stations, repeaters, and the like. The radio system 100 depicted has two groups 112, 115 of communicating transceivers. A first group 112 includes two transceivers 113, 114 with an established communication link between them. A second group 115 includes three transceivers 116, 117, 118 also communicating over an established communication link. The present invention recognizes that interference between the groups of transceivers 112, 115 is likely if both groups of transceivers 112, 115 are operating independently. For example, both groups 112, 115 may be channel hopping over the same sequence of communication channels, or on sequences which overlap. The interference would be significant if the communicating groups 112, 115 were sufficiently close to each other, and were attempting to channel hop simultaneously through the same communication channels. Obviously, a more efficient radio communication system would result if these communicating groups were organized so as to not to interfere with each other. Ordinarily, such is the task of a controller or base station in a managed sophisticated radio communication system. However, if there is no such infrastructure support, the solution becomes more difficult.

According to the present invention, both groups of transceivers 112, 115 channel hop among a predetermined sequence of communication channels. In the preferred embodiment, the communication channels comprise a plurality of frequencies organized into a sequence of frequency channels. The frequencies are a subset of the frequency spectrum available for radio communication. The communication channel may comprise one or more frequency channels, such as a transmit and receive frequency pair, or a similar grouping. A prescribed channel hop period, i.e., the period of time which a transceiver, or group of transceivers, may spend continuously utilizing a given communication channel, is also defined. The channel hopping of the first group 112 is time coordinated with the channel hopping of the second group 115. The time coordinated operation between the groups 112, 115 is achieved using individual transceivers 113, 114, 116, 117, 118, operating under a protocol taught by the present invention, the details of which will be described below. The result is a self-organizing radio communication system 100 which does not require a central controller, such as a base station, for frequency allocation and access management.

Figure 2:
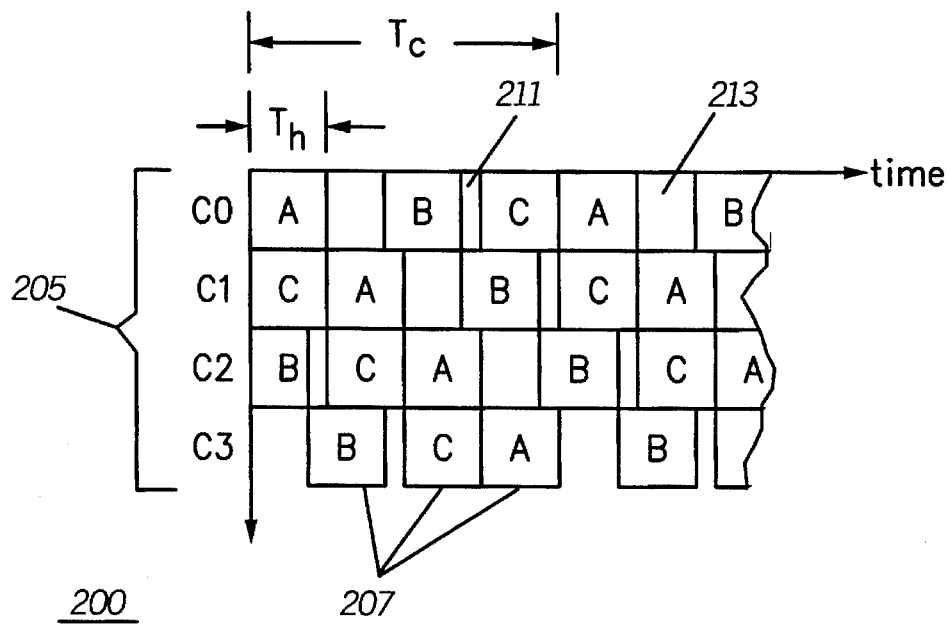
FIG. 2 is a timing diagram of communication on a sequence of communication channels, according to the present invention.

FIG. 2 is a timing diagram 200 of communication on a sequence of communication channels 205 utilized by the radio communication system 100. The sequence 205 includes communication channels C0, C1, C2, and C3. A channel management protocol is defined for the sequence and includes channel hopping protocol parameters such as a channel hop period, Th, and a hop cycle period, Tc. The channel hop period is defined as described above. The hop cycle period is the accumulated time spent each cycle through the sequence by a communicating group. A transceiver wishing to operate on the sequence of communication channels establishes a communication link under the channel management protocol.

The establishment of a communication link requires access to a communication channel which the targeted transceiver is monitoring. Accordingly, the present invention provides for a channel access protocol to facilitate this process. Before establishing a communication link, an initiating transceiver must perform system acquisition, i.e., acquiring a communication slot. A communication slot is generally a time slot, having duration less than or equal to the hop period, which cycles through successive channels of the sequence after each hop period. The radio communication system has a reservation channel (RC) to facilitate acquisition and maintenance of a communication slot on the sequence of communication channels. In the preferred embodiment, the RC is selected from among the sequence of communication channels and is not used for standard data communication. Generally, a channel succeeding the RC in the sequence is expected to be monitored by a targeted transceiver. The RC and monitored channel are preselected, and are known to transceivers wishing to create, or participate in, the radio system. During system acquisition, the RC is used to reserve a communication slot. In the preferred embodiment, communication channel C0 is selected as the RC, and the monitored channel is C1. The RC is also used to preserve a communication slot for communicating groups already operating on the sequence. Generally, a transceiver operating on the sequence of communication channels and wishing to secure its communication slot, must transmit a reservation signal while on the RC.

The reservation signal of the present invention has some preferred characteristics. Preferably, the reservation signal is transmitted such that it has an extended communication or transmission range beyond that of the communication range of signals on the other communication channels of the sequence. This may be accomplished by lowering data transmission rates, by providing more robust transmit symbols, or by increasing the transmit power. The extended range offers additional protection from potential interferers operating outside the normal communication range of a member of a communicating group but within communication range of another member.

Figure 3:
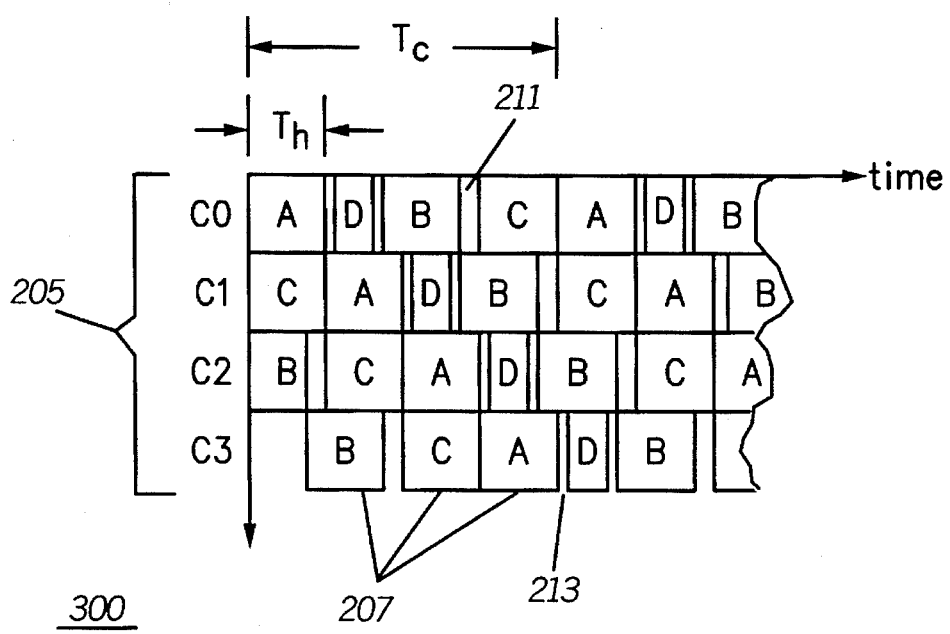
FIG. 3 is timing diagram showing an updated status of the sequence of FIG. 2.

FIG. 2 depicts three communicating groups 207, i.e., groups A, B, C, operating cyclically on the sequence of communication channels 205. Communication links have been established among transceivers of each group, these communicating transceivers maintain the link by channel hopping among the communication channels of the sequence. The communicating groups 207 groups operate on each communication channel for a duration equal to the channel hop period, and channel hop after each channel hop period. As a result of the asynchronous nature of system acquisition process, the communicating groups 207 do not share common boundaries through the sequence. Channel use gaps 211, 213 exist between communicating groups which have a duration smaller than a channel hop period and represent unused channel capacity. The present invention provides a methodology for reducing unused channel capacity by claiming some of the channel use gaps for communications not needing a full channel hop period on each channel. For example, in FIG. 3, an updated timing diagram 300 shows communicating group D established in what was channel use gap 213 on the sequence of communication channels 205.

Figure 4:
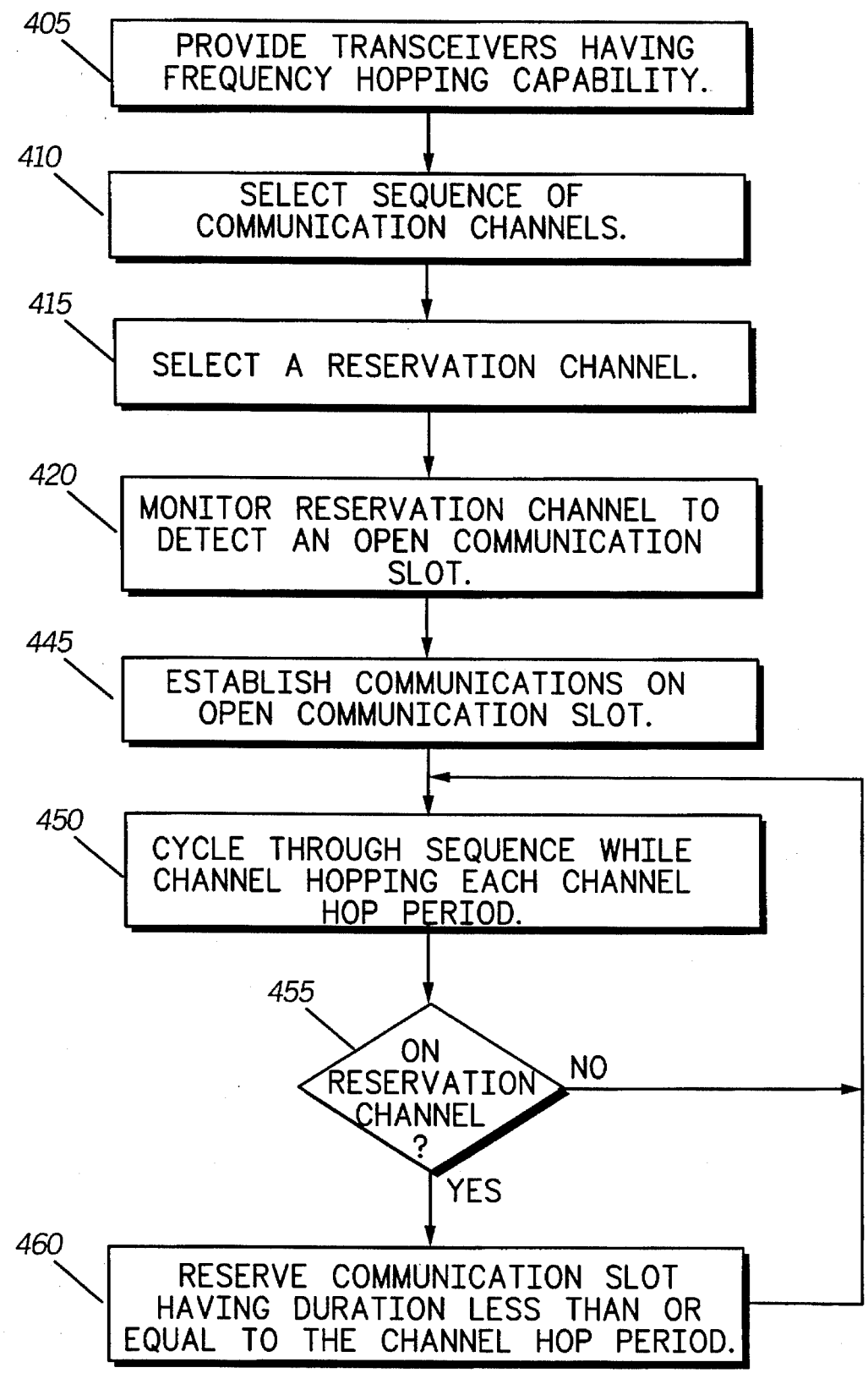
FIG. 4 is a summary of procedures used in the communication protocol in accordance the present invention.

FIG. 4 shows a summary of the procedures needed to operate a radio communication system, according to the present invention. As indicated earlier, transceivers wishing to participate in the radio system must be capable of supporting the channel hopping protocol of the present invention, step 405. An initiating transceiver, for example, transceiver 113 of FIG. 1, first selects the sequence of communication channels on which it wishes to establish communication, step 410. A reservation channel is also selected, step 415. The reservation channel is selected from among the sequence of communication channels and is predefined for a particular sequence. Next, the initiating transceiver must secure a communication slot on the sequence of communication channels. The initiating transceiver monitors the reservation channel to detect whether a reservation signal is being transmitted, step 420. If a reservation signal is not detected during the monitor period, the initiating transceiver makes a determination of whether an open communication slot exists, i.e., whether a channel use gap of acceptable duration exists.

Figure 5:
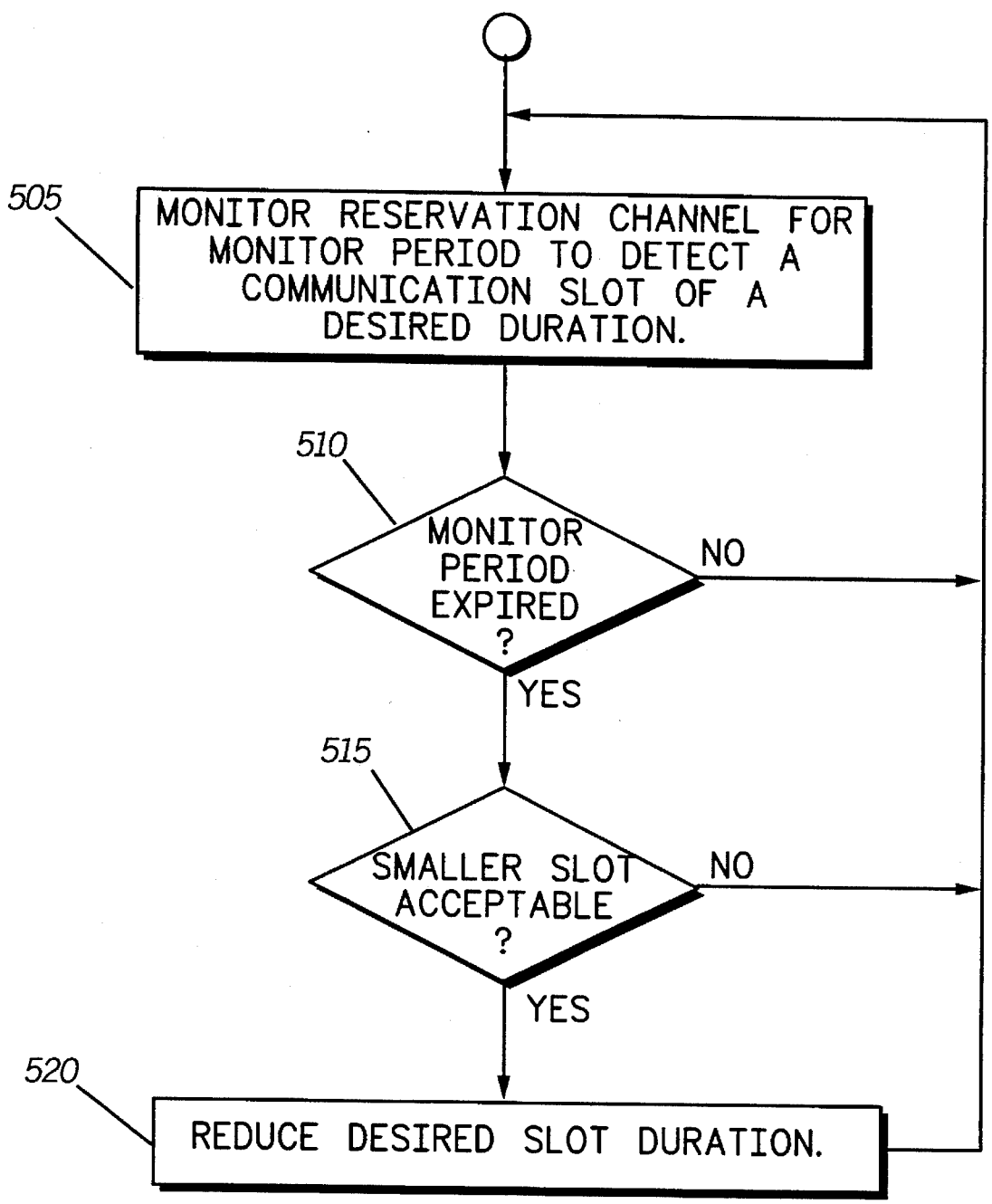
FIG. 5 is a summary of procedures used for locating an open communication slot, in accordance with the present invention.

The present invention provides for asynchronous system acquisition and variable length communication slots. The duration of a communication slot is less than or equal to a maximum duration of the channel hop period. FIG. 5 is a summary of procedures which may be used by the initiating transceiver to determine whether an acceptable communication slot exists. Generally, the reservation channel is monitored for a monitor period to detect a communication slot of a desired duration, step 505. The monitor period provides a time limit, which after expiration, may result in the acceptability of a smaller communication slot. Thus, if monitor period expires and a smaller slot duration is acceptable, the desired slot duration is reduced and the monitor period restarted., steps 510, 515, 520. A minimum slot duration may be defined such that an open communication slot must have a duration of a least the minimum duration. Generally, when a communicating on a slot of maximum duration, transmissions are made using the maximum data throughput rate afforded by the channels of the sequence of communication channels. The data throughput rate is defined as the cumulative data transfer rate on the sequence of communication channels and is limited in part by the duration of the communication slot. The maximum data throughput rate is provided when the duration of the communication slot is equal to the channel hop period. When transmitting on a communication slot of reduced duration, i.e., one having a duration less than the channel hop period, the data throughput rate is correspondingly reduced and will be below the maximum data throughput rate. Additionally, to facilitate the reservation of communication slots of reduced duration, the channel hop period is optionally divided into multiple period segments and the reservation signal transmitted on at least one period segment.

Referring again to FIG. 4, when an open communication slot exists, the initiating transceiver attempts to establish communication with a target transceiver, step 445. Identification information for a target transceiver is transmitted on the open communication slot, preferably on the channel of the sequence succeeding the reservation channel. Communication is established when the targeted transceiver receives the call. Once communication is established, both the initiating and target transceivers can channel hop in unison, cycling through the sequence of communication channels until the communication link is broken, step 450. The protocol requires that a communication slot be reserved each cycle through the sequence communicating by transmitting a reservation signal on reservation channel, if continued use of the sequence of communication channels is required. Thus, the initiating transceiver and/or the target transceiver, and other communicating groups operating on the sequence, transmit a reservation signal as they cycle through the reservation channel to preserve their respective communication slot for a subsequent cycle through the sequence, steps 455, 460.

Figure 6:
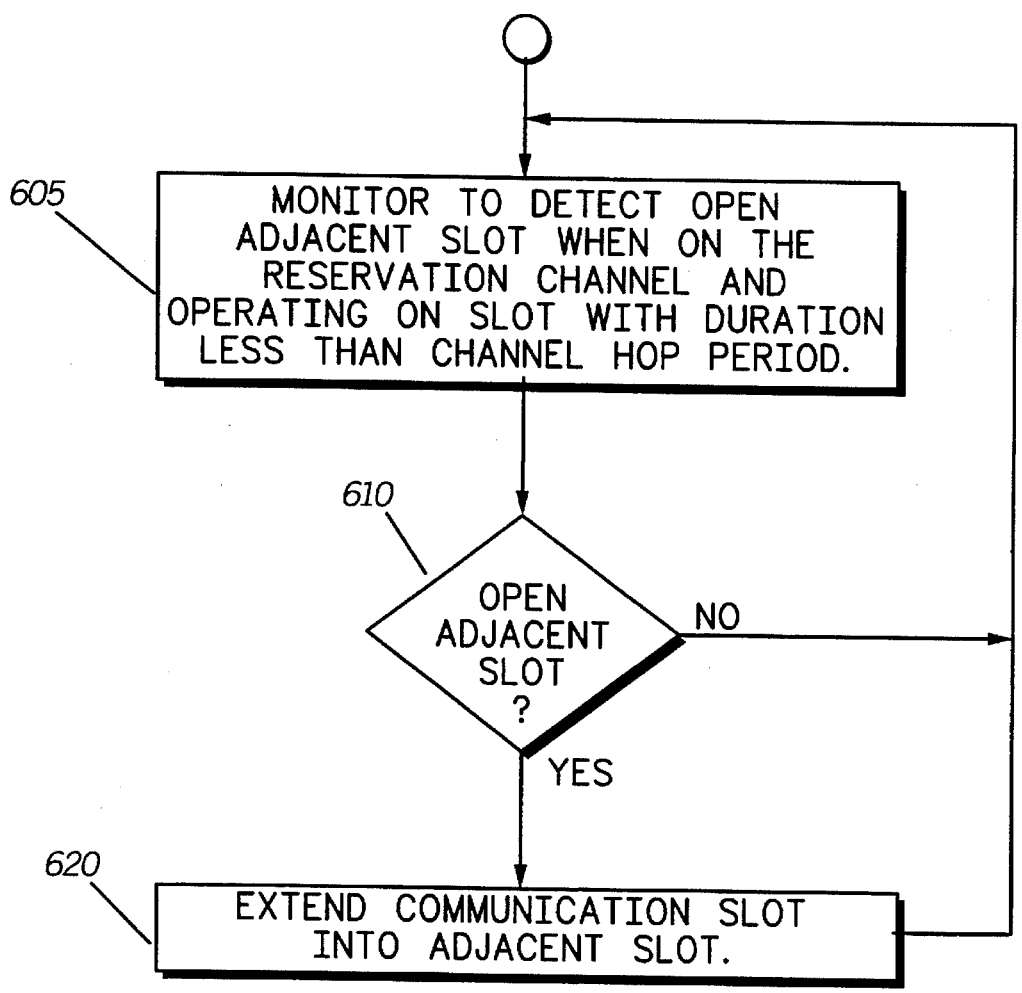
FIG. 6 is a summary of procedures used for extending a communication slot, in accordance with the present invention.

As noted earlier, the duration of the communication slot is less than or equal to the channel hop period. A communicating group may have elected to use a communication slot of less having duration less than the channel hop period out of necessity. The present invention also provides procedures for extending the communication slot of a communicating group to have a duration of at most the channel hop period. FIG. 6 is a summary of these procedures. At least one transceiver of the communicating group monitors the reservation channel, when on the reservation channel, to detect whether an open adjacent communication slot exists, steps 605, 610. An adjacent communication slot may be created by the termination of communications among a separate communicating group. This may be detected by monitoring the reservation channel using communication dead time which may be present for one or more communicating transceivers. For example, the time difference between the communication slot duration and the channel hop period may be used for monitoring activity. If an open adjacent slot is detected, the communicating group may extend its communication slot into the adjacent slot, step 620.

Figure 7:
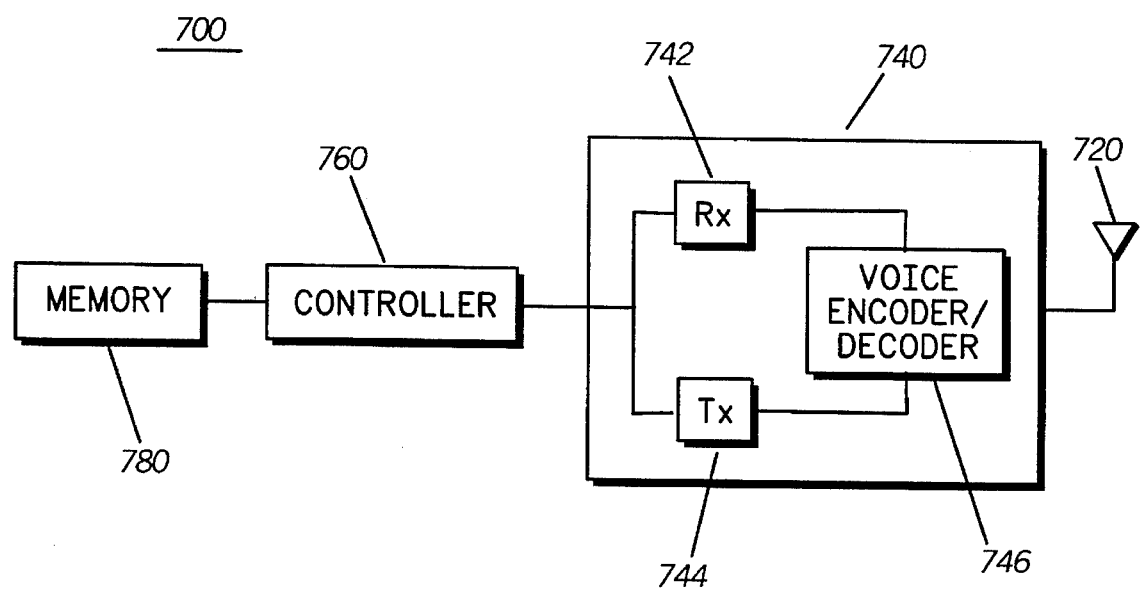
FIG. 7 is a block diagram of a radio capable of organizing a radio communication system, in accordance with the present invention.

FIG. 7 shows a portion diagram of a radio 700 capable of organizing, or participating in, the radio communication system described above, in accordance with the present invention. The transceivers 113, 114, 116, 117, 118, described above are similar in structure and functionality. The radio 700 is an electronic communication device used for two-way communication, and is capable of receive and transmit operation using well known principles. A controller 760 uses logic and other information from an electrically coupled memory portion 780 to control the overall operation of the radio 700. The controller 760 is electrically coupled to an RF portion 740 which includes a receiver 742, a transmitter 744, and a voice encoder/decoder 746. The RF portion 740 is electrically coupled to an antenna 720. For receive operations, communication signals are received by the antenna 720 and are selectively processed by the receiver 742. Similarly, for transmit operations, communication signals are processed by the transceiver 744 and radiated through the antenna 720. The voice encoder/decoder 746 processes speech signals. The transmitter 744 and receiver 742 operate under the control of the controller 760. According to the invention, the controller 760, cooperates with the memory portion 780, and RF portion 740, to perform the communication management protocol functions, including the system acquisition and communication slot reservation protocol described above. For example, the radio operates to reduce or increase data throughput rate depending on the duration of available communication slots, with a corresponding decrease or increase in voice quality.

In summary the present invention provides for a radio communication system including a channel management protocol and devices capable of operating under that protocol. Using the communication device and protocol, two or more communicating groups can be organized to substantially reduced the potential of interference among them, and to substantially improve the efficient use of communication channels. In the preferred embodiment, a plurality of frequencies are organized into a sequence of communication channels. Transceivers already operating on the sequence of communication channels, transmit a reservation signal when on the reservation channel, to preserve a communication slot. A transceiver wishing to initiate communication on the sequence, first monitors the reservation channel to detect whether an open communication slot exists. The transceiver may reduce the duration of the communication slot required depending on communication traffic conditions. When an open communication slot exists, the initiating transceiver establishes communication with a target transceiver and both channel hop on the sequence. The present invention also contemplates the extension of a communication slot when an open adjacent slot is detected.

The communication device and communication channel management protocol describe offers several advantages. For example, a method is provided for sharing available communication channels while reducing interference between communicating groups. A transceiver wishing to operate within the sequence of communication channels does not need to locate precise boundaries of communication slots used by other communicating groups. Rather, the initiating transceiver locates a communication slot and channel hops, according to a defined channel hop period to ensure that communication slots are not overlapped. In effect, different communicating groups operating on the sequence of communicating channel, will channel hop in a time coordinated manner to avoid channel use overlap. By time coordinating channel hopping of communicating groups, the likelihood of interference is reduced. Additionally, by requiring that a communication slot within the sequence of communication channel is reserved into order to maintain that communication slot, an orderly acquisition methodology is established. The present invention provides for efficient use of communication channels. For example, variable duration communication slots may be used. Yet this efficient channel utilization is accomplished without the use of a central controller, such as a base station, and the like, because the protocol capability is incorporated into each transceiver. The result is a low cost radio communication system which promotes efficient use of shared communication resources.

What is claimed is:

1. A method of operating a radio communication system, the radio communication system having first and second transceivers, the method comprising the steps of:

selecting a sequence of communication channels;

selecting a reservation channel from among the sequence of communication channels;

providing a channel hop period for channel hopping on the sequence of communication channels;

at the first transceiver:
cycling through each channel of the sequence of communication channels within a communication slot, while channel hopping at an interval equal to the channel hop period; and reserving a communication slot of a slot duration less than the channel hop period for a subsequent cycle through the sequence of communication channels by transmitting a reservation signal for the slot duration when on the reservation channel;

at the second transceiver:
monitoring the reservation channel to detect an open communication slot indicated by an absence of a reservation signal on the reservation channel, including the steps of:

monitoring the reservation channel for a monitor period of at least a hop cycle period to detect an open communication slot having a duration of at least the channel hop period; and when an open communication slot is not detected within the monitor period, monitoring the reservation channel to detect an open communication slot having a duration less than the channel hop period; and establishing communications in the open communication slot on the sequence of communication channels, when an open communication slot exists.

2. The method of claim 1, wherein the step of reserving a communication slot, comprises the steps of:

dividing the channel hop period into multiple period segments; and transmitting the reservation signal for at least one period segment when on the reservation channel.

3. The method of claim 1, further comprising the steps of:

providing a maximum data throughput rate for transmissions on the sequence of communication channels; and transmitting at a data throughput rate less than the maximum data throughput rate for transmissions on a communication slot having a duration of less than the channel hop period.

4. The method of claim 1, further comprising the steps of:

monitoring the reservation channel to detect whether an adjacent open communication slot exists, when on the reservation channel and operating on a communication slot having a duration of less than the channel hop period; and extending the communication slot into the adjacent communication slot when an open adjacent communication slot exists.

5. The method of claim 1, wherein the step of transmitting a reservation signal, comprises the step of transmitting a signal on the reservation channel having a range extending beyond communication range on other communication channels of the sequence of communication channels.

6. A method of operating a radio communication system using variable transmission reservation, the radio communication system having a sequence of communication channels, including a reservation channel, and a channel hopping protocol for operating on the sequence of communication channels, the channel hopping protocol having a defined channel hop period, the method comprising the steps of:

monitoring the reservation channel to detect an open communication slot indicated by an absence of a reservation signal on the reservation channel including the steps of:

determining whether there exists an open communication slot having a duration of at least the channel hop period; and when an open communication slot having a duration of at least the channel hop period is not detected, determining whether there exists an open communication slot having a duration less than the channel hop period;

establishing communications in the open communication slot on the sequence of communication channels, when an open communication slot exists; and cycling through each channel of the sequence of communication channels within a communication slot, while channel hopping at an interval equal to the channel hop period.

7. A method of operating a radio communication system using variable transmission reservation, the radio communication system having a sequence of communication channels, including a reservation channel, and a channel hopping protocol for operating on the sequence of communication channels, the channel hopping protocol having a defined channel hop period, the method comprising the steps of:

monitoring the reservation channel to detect an open communication slot indicated by an absence of a reservation signal on the reservation channel, including the steps of:

monitoring the reservation channel for a monitor period of at least a hop cycle period to detect an open communication slot having a duration of at least the channel hop period; and when an open communication slot having a duration of at least the channel hop period is not detected within the monitor period, monitoring the reservation channel to detect an open communication slot having a duration less than the channel hop period;

establishing communications in the open communication slot on the sequence of communication channels, when an-open communication slot exists; and cycling through each channel of the sequence of communication channels within a communication slot, while channel hopping at an interval equal to the channel hop period.

8. The method of claim 7, wherein the step of reserving a communication slot, comprises the steps of:

dividing the channel hop period into multiple period segments; and transmitting the reservation signal for at least one period segment when on the reservation channel.

9. The method of claim 6, further comprising the steps of:

providing a maximum data throughput rate for transmissions on the sequence of communication channels; and transmitting at a data throughput rate less than the maximum data throughput rate for transmissions on a communication slot having a duration of less than the channel hop period.

10. The method of claim 6, further comprising the steps of:

monitoring the reservation channel to detect whether an adjacent open communication slot exists, when on the reservation channel and operating on a communication slot having a duration of less than the channel hop period; and extending the communication slot into the adjacent communication slot when an open adjacent communication slot exists.

11. A radio communication system operable over a sequence of communication channels, including a reservation channel, under a channel hopping protocol, the radio communication system having a defined channel hop period, the radio communication system comprising:

a transceiver, comprising:

means for monitoring the reservation channel to detect an open communication slot indicated by an absence of a reservation signal having a duration of at least the channel hop period on the reservation channel; and means for determining that an open communication slot having a duration of at least the channel hop period does not exist, and for consequently establishing communications in an open communication slot having a duration less than the channel hop period on the sequence of communication channels;

means for cycling through each channel of the sequence of communication channels within the communication slot, while channel hopping at an interval equal to the channel hop period: and means for maintaining the communication slot having a slot duration less than the channel hop period for a subsequent cycle through the sequence of communication channels by transmitting a reservation signal when on the reservation channel.

12. In a radio communication system having a sequence of communication channels, including a reservation channel, and a channel hopping protocol for operating on the sequence of communication channels, the channel hopping protocol having a defined channel hop period, a transceiver, comprising:

means for monitoring the reservation channel to detect an open communication slot, having a duration less than the channel hop period, indicated by an absence of a reservation signal on the reservation channel;

means for establishing communications in the open communication slot on the sequence of communication channels, when an open communication slot exists;

means for determining a maximum data throughput rate for transmission on the sequence of communication channels;

means for transmitting at a data throughput rate less than the maximum data throughput rate for transmissions on the communication slot when the communication slot has a duration of less than the channel hop period: and means for cycling through each channel of the sequence of communication channels within the communication slot, while channel hopping at an interval equal to the channel hop period.

13. A method of operating a radio communication system, the radio communication system having a channel hopping protocol with a defined channel hop period, the method comprising the steps of:

selecting a sequence of communication channels for operation under the channel hopping protocol;

selecting a reservation channel from among the sequence of communication channels;

monitoring the reservation channel to detect an open communication slot indicated by an absence of a reservation signal having a duration of at least the channel hop period on the reservation channel; and establishing communications in an open communication slot having a duration less than the channel hop period on the sequence of communication channels, after determining that an open communication slot having a duration of at least the channel hop period does not exist.

14. The method of claim 13, further comprising the steps of: cycling through each channel of the sequence of communication channels within the communication slot, while channel hopping at an interval equal to the channel hop period; and maintaining the communication slot having a slot duration less than the channel hop period for a subsequent cycle through the sequence of communication channels by transmitting a reservation signal for a duration less than the channel hop period, when on the reservation channel.

15. The method of claim 13, further comprising the steps of:

providing a maximum data throughput rate for transmissions on the sequence of communication channels; and transmitting at a data throughput rate less than the maximum data throughput rate for transmissions on a communication slot having a duration of less than the channel hop period.

16. The method of claim 13, further comprising the steps of:

monitoring the reservation channel to detect whether an open adjacent communication slot exists, when on the reservation channel and operating on a communication slot having a duration of less than the channel hop period; and extending the communication slot into the adjacent communication slot when an open adjacent communication slot exists.

* * * * *